(12) United States Patent
Strothmann et al.

(10) Patent No.: US 6,242,822 B1
(45) Date of Patent: Jun. 5, 2001

(54) ELECTRIC MACHINE

(76) Inventors: Rolf Strothmann, Kobenhüttweg 49, 66123 Saarbrücken (DE); Thomas Strothmann, Noldestrasse 3, 49134 Wallenhorst (DE)

( * ) Notice: Subject to any disclaimer, the term of this patent is extended or adjusted under 35 U.S.C. 154(b) by 0 days.

(21) Appl. No.: 08/894,935

(22) PCT Filed: Mar. 1, 1996

(86) PCT No.: PCT/EP96/00863
§ 371 Date: Jan. 12, 1998
§ 102(e) Date: Jan. 12, 1998

(87) PCT Pub. No.: WO96/27940
PCT Pub. Date: Sep. 12, 1996

(30) Foreign Application Priority Data

| Mar. 3, 1995 | (DE) | 195 07 489 |
| Mar. 3, 1995 | (DE) | 195 07 490 |
| Mar. 29, 1995 | (DE) | 195 11 434 |
| Nov. 15, 1995 | (DE) | 295 18 104 U |

(51) Int. Cl.$^7$ .............................. H02K 1/27; H02K 21/12
(52) U.S. Cl. .............................................. 310/12
(58) Field of Search ................... 310/12, 13, 14, 310/91, 254; 318/135, 432, 433, 445, 484

(56) References Cited

U.S. PATENT DOCUMENTS

| 4,315,171 | 2/1982 | Schaeffer | 310/49 R |
| 4,847,526 | * 7/1989 | Takahara et al. | 310/185 |
| 4,978,895 | * 12/1990 | Schwarz | 318/254 |
| 5,206,567 | * 4/1993 | Sakurai et al. | 318/439 X |
| 5,298,827 | * 3/1994 | Sugiyama | 310/156 |
| 5,672,944 | * 9/1997 | Gokhale et al. | 318/254 |
| 5,821,725 | * 10/1998 | Wang et al. | 318/799 |

FOREIGN PATENT DOCUMENTS

| 2386181 | 10/1978 | (FR) . |
| 2434505 | 3/1980 | (FR) . |
| 2057778 | 4/1981 | (GB) . |

OTHER PUBLICATIONS

I.E.E.E., vol. MAG 23, NO 5, Sep. 1987, New York, pp. 2578–2580, K. Hayafune; E. Masada; Dynamics of the PM Type Linear Synchronous Motor Magnetically Levitated Carrier Vehicle Sep. 1987.

Patent Abstracts of Japan, vol. 014, No. 268 (E–0939), Jun. 11, 1990 & JP 2083903 (Asahi Chem Co Ltd), Mar. 26, 1990.

* cited by examiner

*Primary Examiner*—Nestor Ramirez
*Assistant Examiner*—Judson H. Jones
(74) *Attorney, Agent, or Firm*—Friedrich Kueffner

(57) ABSTRACT

An electric machine includes a separately exited rotor arrangement for the generation of magnetic fields which follow one another in the movement direction of the rotor, each magnetic field corresponding to a whole magnetic period, and stator poles arranged so as to follow one another along the rotor arrangement, wherein a number of stator poles which is not a whole number is allotted to a magnetic period. A varying offset between the magnetic field periods and the stator poles caused by the difference is at least partly compensated for by a correspondingly time-delay supply of the stator pole windings.

13 Claims, 4 Drawing Sheets

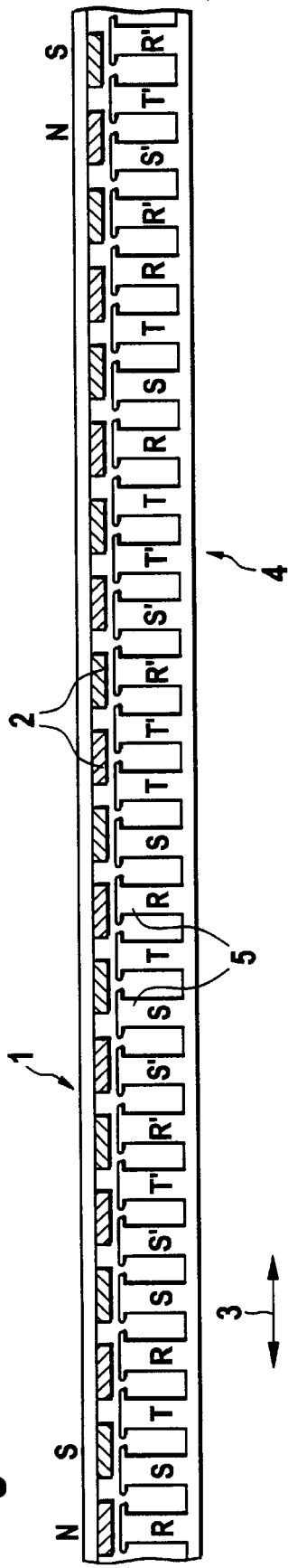
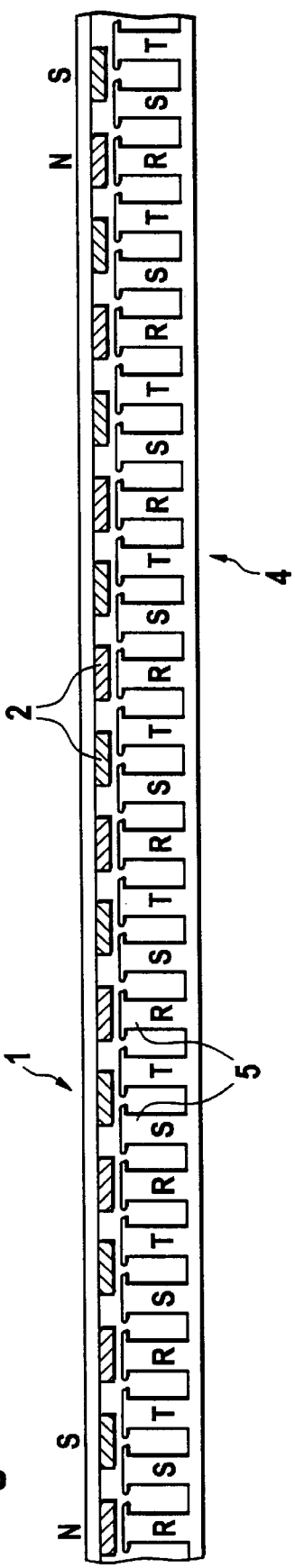

ELECTRIC MACHINE

BACKGROUND OF THE INVENTION

1. Field of the Invention

The present invention is directed to an electric machine with a separately excited rotor order for the generation of magnetic fields which follow one another in the movement direction of the rotor, each magnetic field corresponding to a whole magnetic period, and with stator poles which are arranged so as to follow one another along the rotor arrangement.

2. Description of the Related Art

In known electric machines of this type with a separately excited rotor (or stator, the two terms rotor and stator being interchangeable for present purposes), the magnetic fields corresponding to the whole magnetic periods are formed by individual poles, a north pole and a south pole (for each magnetic period), which are separated from one another. Stator pole sets which correspond with respect to the arrangement and quantity of stator poles are provided in accordance with the quantity of magnetic fields formed by the pairs of rotor poles, so that corresponding arrangements of stator poles are located under every pair of rotor poles. Permanent magnets can be used, for example, for the rotor poles.

As a result of stray flux and especially owing to the gaps between the rotor poles, a rotor field is formed in machines of this type such that a movement of the rotor relative to the stator results in a nonlinear variation of the forces present at the rotor poles, which forces are dependent on the sum of the prevailing field amounts at the poles. This results finally in a self-locking behavior, i.e., a self-holding torque occurs (also known as cogging torque or cogging). This self-locking behavior is especially pronounced during slow idling. This effect occurs especially because the nonlinearly changing forces add up over the entire length of the stator or rotor due to the constantly identical ratios within the individual magnetic periods of the rotor field. In connection with the self-locking behavior, such machines have other disadvantages such as rough running, vibrations, the need to operate the machines as minimum speeds, etc.

Since narrow limits are imposed on variations in the shape of the stator and rotor poles, a reduction of the self-holding torque is possible only by means of offsetting the pole stack or laminated core, increasing the air gap, or by means of a specially developed pole head shape. However, these steps impair the operating parameters of the machine, so that a machine with a self-locking behavior which is improved as a result of these steps represents an unfavorable compromise.

SUMMARY OF THE INVENTION

It is the object of the present invention to provide an electric machine of the type mentioned in the beginning, whose self-holding torque is eliminated or at least reduced.

In accordance with a first solution according to the invention, this object is met in an electric machine which is characterized in that a number of stator poles which is not a whole number is allotted to a magnetic period.

In accordance with this solution of the invention, there result different arrangements of stator poles relative to the individual magnetic fields corresponding to whole magnetic periods, so that nonlinearly changing forces present at the rotor poles which could lead to a self-holding torque do not add up along the length of the stator or rotor leading to a multiplying of these forces, but rather cancel one another by reducing or eliminating the self-holding torque. In accordance with the number of stator poles allotted to a magnetic period, which number differs from a whole number, there results a varying offset between the individual magnetic fields corresponding to the whole magnetic periods and the stator poles arranged opposite thereto, so that differently oriented forces act on the different rotor poles, which forces can average out along the length of or circumference of the stator or rotor.

In accordance with the divergence from the whole number, a periodicity in the spatial arrangement of the stator poles relative to the magnetic field periods within the rotor or stator length is avoided. Accordingly, there are no repetitions in the spatial relationships between the magnetic fields and stator poles, so that there is no addition effect which magnifies cogging torques.

The construction of the electric machine according to the invention can advantageously make use exclusively of standard materials and standard structural component parts.

In an advantageous embodiment form of the invention, the stator poles are supplied in a time-delayed manner to compensate for the varying spatial offset between the magnetic fields and the stator poles which is caused by the divergence of the number of stator poles to be allotted to a magnetic field period from a whole number. As a result of this step, impairment of the motor output is compensated in that the time-delayed supply which takes into account the offset provides that the contribution of the stator poles to the total force generating the motor torque is substantially independent from their offset.

Another electric machine according to the invention in which the above-stated object is met is characterized in that the magnetic fields which follow one another, each of which corresponds to a whole magnetic period, are formed by permanent magnet portions having alternately a magnetic north pole and a magnetic south pole, wherein separating gaps which extend diagonally to the movement direction of the rotor with alternately opposite angles of inclination are provided between the permanent magnet portions.

Also, an averaging effect can be achieved by the solution according to the invention, in which amounts of force by means of which a holding torque could be formed cancel one another at least partially as a result of the configuration of the separating gaps.

In an advantageous construction of this additional solution according to the invention, the separating gaps are parts of an individual, continuous separating gap by which, extending continuously in the movement direction, the magnet bodies containing the permanent magnet portions are separated from one another, wherein one of the magnet bodies comprises the magnet elements for the north poles and the other magnet body comprises the magnet elements for the south poles. In particular, the continuous separating gap can be configured in the shape of a sine curve. Discontinuities in the field pattern between the opposite poles are suitably compensated by means of this continuous separating gap, which contributes to a further reduction of the self-holding torque.

Further advantageous possibilities for configuring the invention follow from the subclaims.

The invention will now be explained and described more fully with reference to embodiment examples and with reference to the accompanying drawings referring to these embodiment examples.

BRIEF DESCRIPTION OF THE DRAWINGS

Shown in the drawings are:

FIG. 1 a first embodiment example for the present invention;

FIG. 2 a view illustrating the first embodiment example according to FIG. 1 showing an electric machine with corresponding numbers of rotor pole pairs and stator pole sets;

DESCRIPTION OF THE PREFERRED EMBODIMENTS

Figure 3:
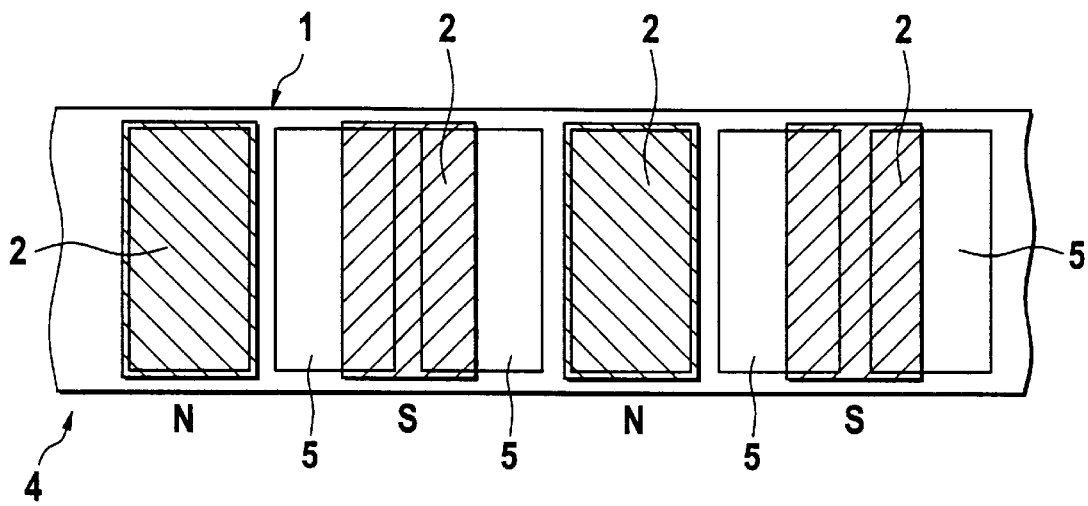
FIG. 3 the embodiment example of FIG. 1 considered in a viewing direction vertical to the plan view of FIG. 1 (section)

A rotor of an electric machine is designed by reference number 1 in FIGS. 1 to 3. The rotor contains permanent magnets 2. The permanent magnets 2 are arranged one after the other with constant intermediate spacing in accordance with the movement directions of the rotor which are designated by a double arrow 3. A stator 4 having stator poles 5 arranged one after the other in the movement directions of the rotor 1 with constant intermediate spacing is arranged opposite to the north poles and south poles 2 of the rotor 1. The stator poles 5 are provided with stator windings not shown in FIGS. 1 to 3.

For the sake of simplicity, a linear machine is shown in FIGS. 1 to 3. However, the illustration could also be seen as a developed view of the rotor and stator of a rotating machine. According to the embodiment example shown in FIG. 1, the electric machine has a total of twenty permanent magnets for forming ten pairs of rotor poles, each pair of rotor poles containing a magnetic north pole and a magnetic south pole. Located across from the ten pairs of rotor poles, each pair forming a magnetic field period, is a total of twenty-seven stator poles, so that the non-whole number 2.7 of stator poles is accorded to a pair of rotor poles. In the view shown in FIG. 2, the rotor contains nine rotor pole pairs. In this case, the number of stator poles allotted to a rotor pole pair is 3.

As can be seen from a comparison of FIGS. 1 and 2, when there is a whole-number quotient of the number of stator poles to the number of rotor pole pairs, there results a spatial relationship between the stator poles and rotor pole pairs which repeats over the length of the stator or rotor, whereas, when the quotient differs from the even number, an offset occurs between the stator poles and permanent magnets which changes from stator pole to stator pole. Therefore, in the embodiment example shown in FIG. 1, there is no periodically recurring spatial relationship between permanent magnets and stator poles within the length of the stator.

The stator poles of the embodiment example of an electric machine shown in FIGS. 1 and 3 are supplied by a three-phase ac supply voltage, wherein a 0° phase of the ac supply voltage is present at the windings of the stator poles designated by the letter R, a 120° phase of the ac supply voltage is present at the windings of the stator poles designated by S, and a 240° phase of the ac supply voltage is present at the windings of the stator poles designated by T. The windings of the stator poles designated by R', S' and T' are linked in a polarity inversion circuit, in the simplest case by means of simple polarity inversion, in such a way that further phases result from the three above-mentioned phases for these windings, wherein a 600 phase is present at the windings of the stator poles designated by T', a 180° phase is present at the windings of the stator poles designated by R', and a 300° phase is present at the windings of the poles designated by S'. Accordingly, there is available for the supply of all stator poles a total of six different phases with phase jumps that are halved in relation to the three-phase ac supply voltage.

During operation of the electric machine shown in FIGS. 1 and 3, the varying offset of the stator poles relative to the rotor pairs provides that forces present at the respective rotor poles which would lead to a self-holding torque are averaged out. On the other hand, in the machine shown in FIG. 2 in which the same spatial relationship between the rotor poles and stator poles repeats after every three stator poles, all forces act in the same direction and a self-holding torque is generated.

On the other hand, as a result of the varying offset of the stator poles in relation to the rotor poles, the pole phases of the three-phase supply voltage, after a certain length of the stator or rotor, would no longer be adapted to the respective spatial positions of the stator poles within the magnetic periods which have just been run through, because the similar position of the stator poles within the magnetic periods is decisive for the flux pattern through the windings on the stator poles and, over its derivation according to time, is also decisive for the voltage configuration in the windings.

In this case, compensation is effected in that a portion of the stator poles with phases which are offset by 60° in each instance in relation to the phases of the three-phase ac supply voltage is supplied by means of a suitable connection of the star-connected windings of the stator poles. Accordingly, in contrast to the only three primary phases of the ac supply voltage, finely adapted phases are available which are suitable for compensating the varying offset of the stator poles relative to the rotor poles in such a way that there results along the length of the rotor, in an approximately uniformly distributed manner, forces generating the motor torque which are present at the rotor poles, so that the running of the machine is not impaired in spite of the described offset of the poles. The angle errors still resulting in the embodiment example shown in FIGS. 1 and 3 follow from the following table: 6 phrases, 27 stator poles, 10 rotor pole pairs or 20 rotor poles Representation of stationary state, stator pole 1=0°=reference phase R All angles in degrees

| Stator pole | mechanical angle | electrical angle | phase | angle error |
|---|---|---|---|---|
| 1 | 0.000 | 0.000 | R | 0.000 |
| 2 | 13.333 | 133.333 | S | 13.333 |
| 3 | 26.667 | 266.667 | T | 26.667 |
| 4 | 40.000 | 40.000 | R | 40.000 |
| 5 | 53.333 | 173.333 | S | 53.333 |
| 6 | 66.667 | 306.667 | S' | 6.667 |
| 7 | 80.000 | 80.000 | T' | 20.000 |
| 8 | 93.333 | 213.333 | R' | 33.333 |
| 9 | 106.667 | 346.667 | S' | 46.667 |
| 10 | 120.000 | 120.000 | S | 0.000 |
| 11 | 133.333 | 253.333 | T | 13.333 |

-continued

| Stator pole | mechanical angle | electrical angle | phase | angle error |
|---|---|---|---|---|
| 12 | 146.667 | 26.667 | R | 26.667 |
| 13 | 160.000 | 160.000 | S | 40.000 |
| 14 | 173.333 | 293.333 | T | 53.333 |
| 15 | 186.667 | 66.667 | T' | 6.667 |
| 16 | 200.000 | 200.000 | R' | 20.000 |
| 17 | 213.333 | 333.333 | S' | 33.333 |
| 18 | 226.667 | 106.667 | T' | 46.667 |
| 19 | 240.000 | 240.000 | T | 0.000 |
| 20 | 253.333 | 13.333 | R | 13.333 |
| 21 | 266.667 | 146.667 | S | 26.667 |
| 22 | 280.000 | 280.000 | T | 40.000 |
| 23 | 293.333 | 53.333 | R | 53.333 |
| 24 | 306.667 | 186.667 | R' | 6.667 |
| 25 | 320.000 | 320.000 | S' | 20.000 |
| 26 | 333.333 | 93.333 | T' | 33.333 |
| 27 | 346.667 | 226.667 | R' | 46.667 |

As can be seen from the table, the maximum possible angular error of 60° is not reached in the embodiment example in question.

Further reductions in the angle errors indicated in the table are possible in that the machine is provided with a combined winding. In the present example of a three-phase system, the known star connections and delta connections, for example, can be used at the same time. In the delta connection, the winding voltage is the inter-phase voltage, i.e., the difference voltage between two phases. Accordingly, in addition to a quantitatively higher winding voltage, there also results a phase offset of 30° in relation to the star system. Therefore, together with the star connection mentioned above, a total of twelve phases can be generated, i.e., the maximum electrical angle error when using this system is reduced to 30° or ±15°. The appropriate connection is found by selecting the best-suited phase for the offset of a stator pole, i.e., the phase with the lowest phase deviation. With respect to winding, it must merely be taken into account that even windings which are only slightly out of phase are connected in series and not in parallel, since there would otherwise be a considerable flow of compensating currents. If a plurality of these electrically offset windings participate within the respective phase, this leads, in addition, to a desirable emphasizing of the fundamental sine wave of the sum phase voltages. The synchronization described by the individual phase shifts reduces the harmonic components of the sum voltage relative to pole arrangements which are not offset in the described manner.

The described effects make themselves evident in a particularly advantageous manner in high-pole machines, since in this case finer pole offsets of the self-locking behavior are more sharply reduced and more poles participate in the phase voltages. Included in this group are, e.g., slow-running machines and machines with a large rotor diameter such as travel motors and servomotors.

In the further embodiment examples shown in FIGS. 4 to 7, identical or identically operating parts are designated by the same reference number, but with the addition of an alphabetic character a, b or c.

Figure 4:
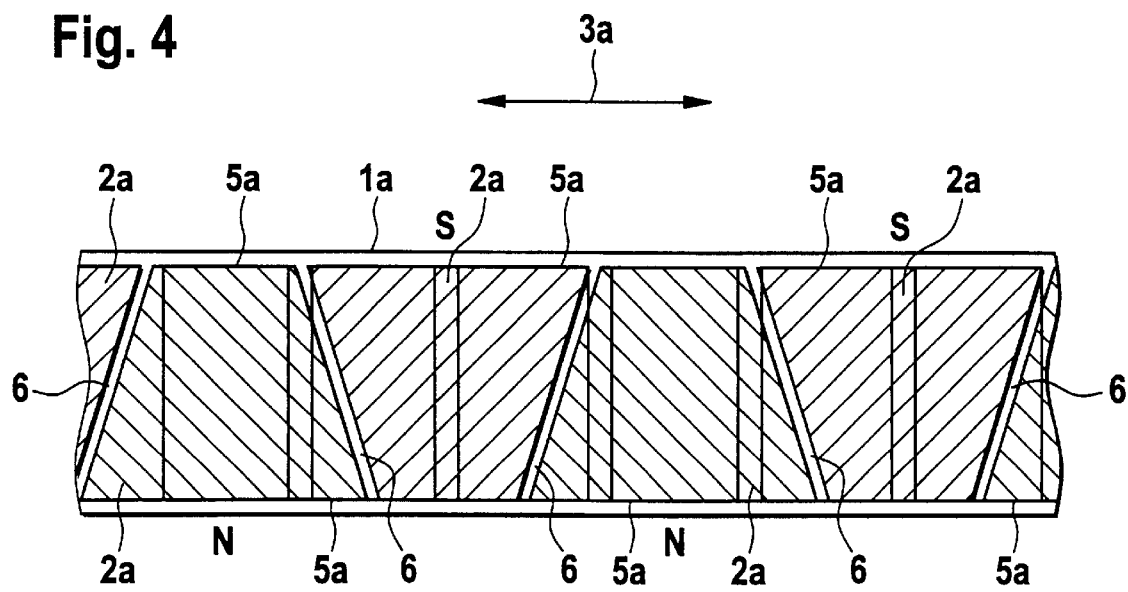
FIG. 4 a second embodiment example for an electric machine according to the invention.

In the embodiment example shown in FIG. 4, permanent magnets 2a connected with a rotor 1a are arranged one after the other in the movement direction of the rotor corresponding to arrow 3a, wherein permanent magnet portions alternately form a magnetic north pole and a magnetic south pole. A rotor magnetic field corresponding to a complete magnetic period is formed by a pole pair. Provided between the individual permanent magnets 2a are separating gaps which extend diagonally relative to the movement direction and are inclined in an alternating manner at opposite angles to the movement direction 3a. Stator poles 5a are located opposite to the permanent magnets 2a, wherein a set of three stator poles 5a is provided for each rotor pole pair. The stator poles of a set are supplied in each instance by a three-phase ac voltage, wherein every stator pole is provided with a winding for one of the three phases.

A reduction in the self-holding torque is likewise achieved by means of the diagonal course of the separating gaps with alternately opposed inclination angles relative to the movement direction in that forces which are present at the rotor poles and which contribute to the self-holding torque are averaged out.

Figure 5:
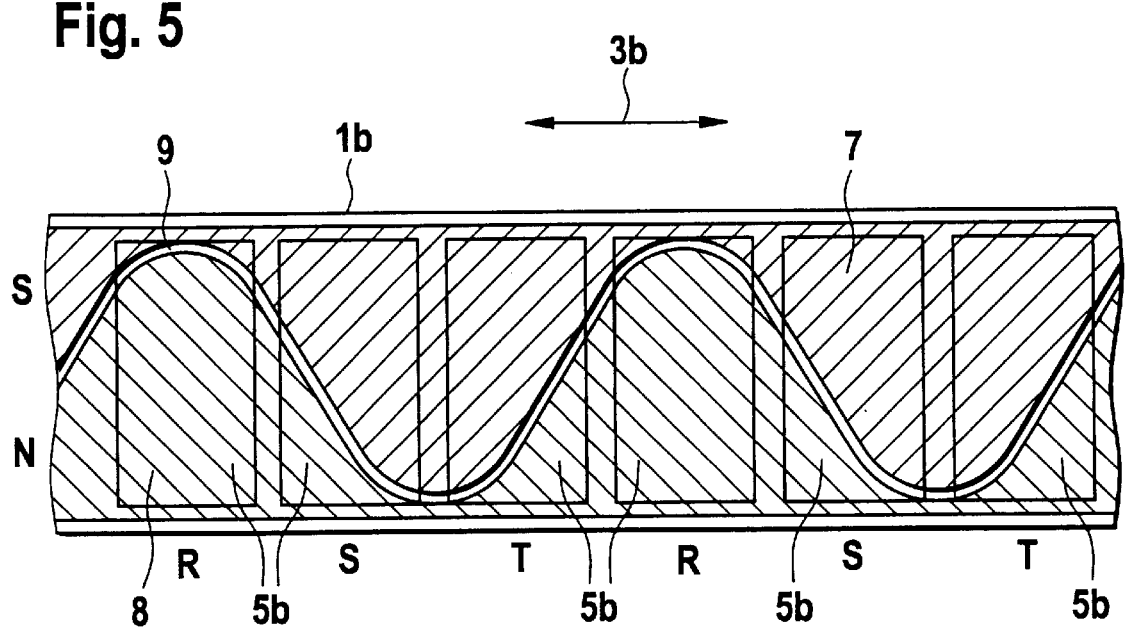
FIG. 5 a third embodiment example for an electric machine according to the invention.
Figure 6:
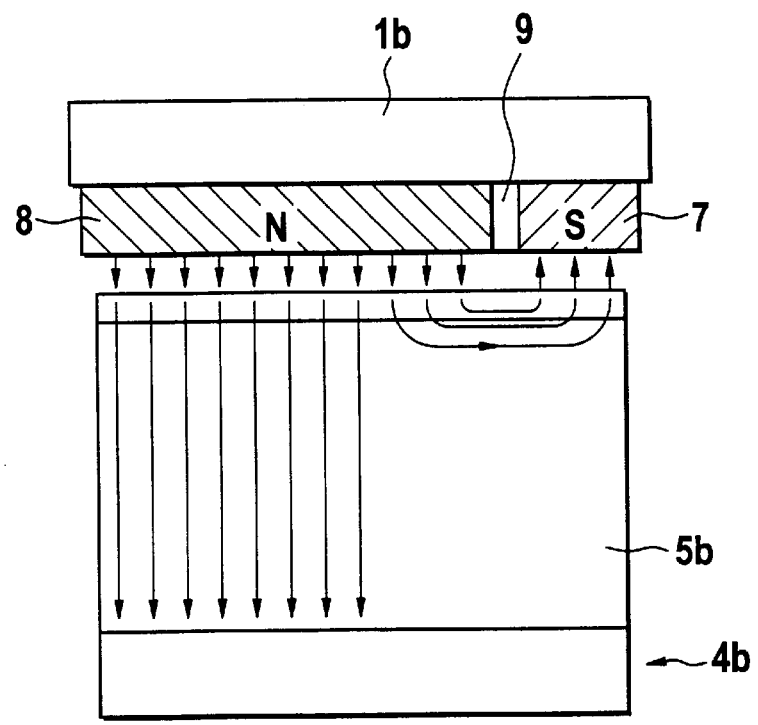
FIG. 6 the embodiment example shown in FIG. 5 in a plan view according to section line I—I in FIG. 5.

The embodiment example in FIGS. 5 and 6 differs from the preceding embodiment example in that a plurality of separating gaps are not formed between permanent magnets; rather, an individual continuous separating gap 9 is formed between magnet bodies 7 and 8 extending in a movement direction 3b of a rotor 1b. The magnet body 7 serves to form magnetic south poles, while the magnet body 8 is provided for forming magnetic north poles. The continuous separating gap has a sinusoidal shape.

Figure 7:
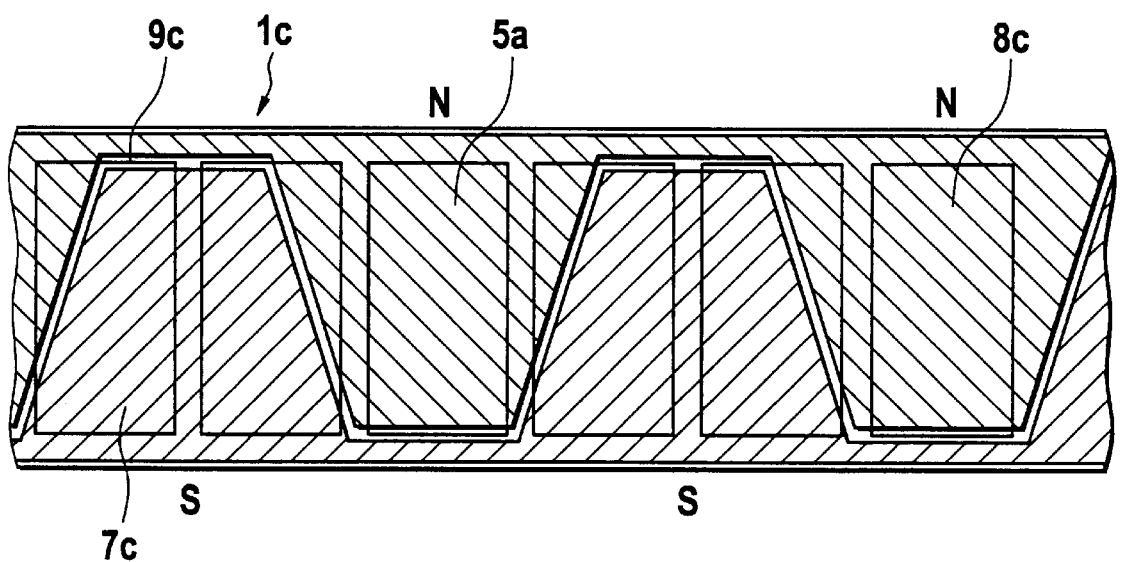
FIG. 7 a fourth embodiment example for an electric machine according to the invention.

In the embodiment example of FIG. 7, the sinusoidal separating gap 9 is replaced by a trapezoidal separating gap 9c. In the embodiment examples with a continuous separating gap 9 shown in FIGS. 5 to 7, in contrast to the arrangement shown in FIG. 4, there are no discontinuities caused by the interruption of the separating gap. By means of varying the gap position transversely to the movement direction, it is possible as a result of the addition of the signed field components generated at the rotor poles and penetrating the stator pole to change the respective resulting stator flux through the stator.

Accordingly, the desired curve shapes can be adjusted for the auxiliary configurations in the stator poles and accordingly the functional configurations of the phase supplies by means of a suitable periodic configuration of the gap position in dependence on the rotor position. Regardless of this, the forces acting at the stator poles can be varied in dependence on the rotor position by varying the surface of the two rotor poles as a result of the addition of the field amounts prevailing between the rotor poles and stator poles in order to influence the self-locking behavior of the machine. Special stator pole shapes are not required.

Insofar as the design requires operation which is completely free from cogging torque, only the field amounts which are active from the point of view of the stators need generally remain constant over a fixed interval in connection with any desired positioning of the rotor. The active surface components of the two rotor poles of an interval are, as a configuration guideline, approximately proportional to the field components described above. Also, the forces acting on the stator poles can be maintained constant in that the above-mentioned field amounts are maintained constant continuously over the movement, so that a self-holding torque can be entirely eliminated.

On the other hand, the difference between the surface components and the sum of the fields acting on the pole (according to definition, the north pole forms the positive field vector and the south pole forms the negative field vector) determines the residual flux through the entire stator pole in question, which residual flux is also relevant in the outer direction; the time derivation of this flux is then proportional, e.g., to the voltage at the winding located on the pole. A corresponding arrangement of the rotor poles and corresponding formation of the gap configuration in dependence on the rotor position serves for the generation of determined flux configurations which ultimately impress the desired current curves and voltage curves on the phases.

The described ratios are illustrated in FIG. 6. A determined portion of the two fluxes generated by the rotor poles penetrates only the pole head and is accordingly compensated by the pole with respect to the overall flux. However, it always maintains and keeps constant the force acting at the pole independent from the position of the rotor and accordingly independent from the position of the separating gap. On the other hand, the shown overall flux remaining after the compensation will be directly dependent on the position of the separating gap and, e.g., effective in the pole winding. These criteria are met by a large number of rotor pole shapes. For a simple and economical solution, determined curve shapes are only approximated. For example, the separating gap shown in FIG. 7 is an approximation of the sinusoidal separating gap according to FIG. 4. It is easy to see that this solution scarcely impairs the usual output specifications of the machine, but can probably eliminate the self-holding torque completely.

The flux loss occurring as a result of the continuous separating gap is usually substantially less than that caused by the known above-described steps for reducing the self-holding torque such as offsetting, increasing the air gap, etc.

Although small cogging torques can be produced by the interruption of the separating gap and resulting discontinuities in the embodiment example shown in FIG. 4, the maximum possible output values of the machine can be generated in return in this arrangement. In the shown embodiment example, interruptions in symmetry in the stator body would be possible without the otherwise usual disadvantageous consequences on the machine behavior. In particular, linear machines have a finite stator length in the movement direction compared with rotary machines and can thus profit by the offered possibility. Further possible constructions relate to the arrangement of determined construction elements in the freed area of the stator. Such elements include, for example, brakes which act directly on the outer diameter of the rotor and which consequently generate high braking torques with small actuating force. Further developments relate to the detection or influencing of the rotor field present in this space which is substantially unaffected by the stator field. Additional structural component parts which are influenced by the rotor field or which influence the rotor field can be accommodated in this space. A device for sensing the rotor position which contains magnetically sensitive semiconductors, especially Hall sensors, and can make do in this way without its own special pole arrangement could be advantageously arranged in this space. But it can also be advantageous to influence the rotor field, wherein this action can be frequency-dependent as in an eddy-current brake, but also position-dependent and periodic as in additional magnet poles of the ferromagnetic parts which, by means of an appropriate design, can generate an independent self-locking behavior which would then be desirable.

In this way, the pole arrangement shown in FIG. 4, for example, can be used in favor of a maximum torque, wherein any small holding torque still occurring can be compensated by a suitable construction influencing the rotor field.

In the described machine constructions, every phase claims only an individual stator pole per magnetic period. The rotor pole width to be provided must be at least as wide in order to generate maximum flux in the stator pole. However, since only two rotor poles are used, the pole areas are correspondingly narrow. The use of magnet material in permanent magnet machines is accordingly considerably reduced. As a result of the symmetrical construction which distributes the phases uniformly on the machine, susceptibility to tolerances and noise development is low.

Since every stator pole carries only one winding, they can be manufactured beforehand optimally when needed and applied individually subsequently.

The individual stator poles are constructed in a compact manner and the windings located thereon are as short as possible with respect to the length of the winding, wherein the winding head can be kept extremely small so that the machine has a low weight, compact constructional form and high efficiency.

The machine shown in FIGS. 1 and 3 can further be influenced with respect to operating characteristics by determined configurations of the rotor poles. For example, a simple offsetting of the rotor poles is possible in order to adapt the electrical configurations to the supply and to further reduce the self-locking torque while maintaining maximum output specifications.

What is claimed is:

1. An electric machine with multiphase power supply comprising a separately excited rotor arrangement for generating magnetic fields which follow one another in a direction of movement of the rotor, each magnetic field corresponding to a whole magnetic period, and stator poles which are arranged so as to follow one another along the rotor arrangement, wherein a number of stator poles which is not a whole number is allotted to a magnetic period which thereby produces a varying offset between the magnetic field periods and the stator poles, further comprising means for at least partly compensating the varying offset between the magnetic field periods and the stator poles caused by the difference using a correspondingly time-delayed supply of windings of the stator poles.

2. The electric machine according to claim 1, comprising circuits for generating additional supply voltage phases from a multiple-phase supply voltage for effecting the time-delayed supply.

3. The electric machine according to claim 2, wherein the circuits are comprised of a suitable connection of the stator pole windings.

4. The electric machine according to claim 3, comprising connections with at least one of star-connections and delta connections for generating additional phases from a three-phase supply voltage.

5. The electric machine according to claim 1, wherein the rotor comprises poles formed by permanent magnets.

6. The electric machine according to claim 1, comprising a plurality of stator pole sets, wherein each stator pole set has the same number of stator poles and is supplied by a plurality of phases of a supply voltage.

7. The electric machine according to claim 6, comprising stator pole sets with a number of stator poles corresponding to the number of phases of a supply voltage.

8. The electric machine according to claim 6, wherein restator pole of a stator pole set has a winding for each supply voltage phase.

9. An electric machine comprising a separately excited rotor arrangement for generating magnetic fields which follow one another in a direction of movement of the rotor, each magnetic field corresponding to a whole magnetic period, and stator poles which are arranged so as to follow one another corresponding to the magnetic fields, wherein each of the magnetic fields which follow one another corresponds to a whole magnetic period and is formed by permanent magnet portions having alternately a magnetic north pole and a magnetic south pole, wherein separating gaps extending diagonally to a direction of movement of the rotor with alternately opposite angles of inclination are defined between the permanent magnet portions, and wherein one or more stator poles are removed from one of the rows of stator poles corresponding to the magnetic fields which follow one another, such that an electrically or/and mechanically unsymmetrical machine construction is formed.

10. The electric machine according to claim 9, wherein the separating gaps are parts of a single continuous gap for separating from each other magnet bodies extending in the movement direction and containing the permanent magnet portions, wherein one of the magnet bodies comprises the magnet elements for the north poles and another of the magnet bodies comprises the magnet elements for the south poles.

11. The electric machine according to claim 10, wherein the continuous gap has the shape of one of a sine curve and a trapezoidal curve.

12. The electric machine according to claim 10, wherein each separating gap has a varying width.

13. The electric machine according to claim 10, wherein the continuous gap has a varying width.

* * * * *